Sept. 21, 1937.      S. KIYOHARA      2,093,523

LEATHER SOLE IMITATION

Filed July 6, 1936

INVENTOR:
S. Kiyohara
BY:
Glascock Downing & Seebold
ATTORNEYS

Patented Sept. 21, 1937

2,093,523

UNITED STATES PATENT OFFICE 2,093,523

LEATHER SOLE IMITATION

Seiichi Kiyohara, Kobe-Shi, Japan

Application July 6, 1936, Serial No. 89,185

2 Claims. (Cl. 36—32)

This invention relates to an improved india-rubber sole imitating a kind of leather sole and has for its object to provide a rubber sole presenting a mimic appearance of a stitch-edged leather sole.

In the accompanying drawing:—

Figure 1:
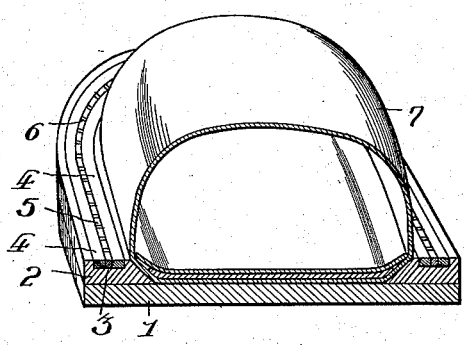
Fig. 1 is a fragmentary perspective view of the toe of a shoe with the rubber sole embodying the invention.
Figure 2:
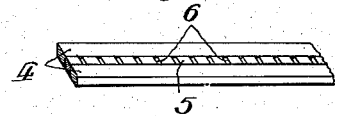
Fig. 2 is a fragmentary perspective view on an enlarged scale of a rubber strip to be inlaid on the edge of the rubber sole.

Referring to the accompanying drawing, particularly to Figs. 1 and 2, 1 represents the body of a rubber sole, on the edge of which a rubber edge member 2 is mounted by cementing. The edge member is of a leather-like colour and has a recess 3 formed in its upper face in which rubber strips 4 and 5 are snugly arranged and cemented. The rubber strips 4 are of the same colour as the edge member 2 and the rubber strip 5 is of the same colour as a stitching twine, such as a white colour and recessed at regular intervals as indicated at 6. The complete rubber sole is applied to the body of a shoe 7 and the whole shoe is vulcanized. Upon the vulcanization, the body of the sole, the edge member and the strips are united together so as to form substantially an integral body.

Figure 3:
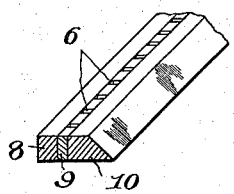
Fig. 3 is a fragmentary perspective view on an enlarged scale of a modification of an edge member.

Fig. 3 shows a modification of the edge member 2, in which the said edge member consists of leather coloured strips 8 and 10, and a strip 9 which is of the same colour as a stitching twine and recessed at regular intervals on its upper face as indicated at 6.

Figure 4:
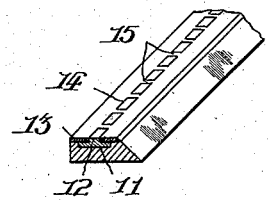
Fig. 4 is a fragmentary perspective view on an enlarged scale of another modification of the edge member.

Fig. 4 shows another modification of the edge member 2, in which a rubber strip of the same colour as a stitching twine 11 with regularly spaced raised members 12 is inlaid in a recess formed on the upper face of the edge member, and a sheet-rubber strip 13 of a leather-like colour with perforations 14 corresponding to the raised members 12 is cemented on the edge member, the raised members being engaged in the perforations. The spaces 15 between the perforations 14 may be sunken or not sunken.

The body of shoe 7 may be of leather, india-rubber or cloth.

Having now particularly described and ascertained the nature of my said invention and in what manner the same is to be performed, I claim:—

1. A rubber sole constructed to imitate a sewed leather sole, which comprises a rubber sole body having a rubber welt member extending about its top marginal portion, said welt member having rubber strips inlaid along its upper face, one of said strips being of the same color as sole attaching thread and being recessed at regular intervals.

2. A rubber sole constructed to imitate a sewed leather sole, which comprises a rubber sole body having a rubber welt member extending about its top marginal portion, said welt member having a rubber strip inlaid along its top marginal portion, said strip being provided with regularly spaced raised portions and a sheet-rubber strip provided with regularly spaced orifices the walls of which engage said raised portions, said first-mentioned rubber strip being of the same color as sole attaching thread.

SEIICHI KIYOHARA.